United States Patent
Agapiou et al.

(10) Patent No.: US 11,095,197 B2
(45) Date of Patent: Aug. 17, 2021

(54) MODULAR STATOR

(71) Applicant: GM GLOBAL TECHNOLOGY OPERATIONS LLC, Detroit, MI (US)

(72) Inventors: John S. Agapiou, Rochester Hills, MI (US); John D. Campbell, Rochester Hills, MI (US); Frederick W. Rhoads, Holly, MI (US); Hongliang Wang, Sterling Heights, MI (US); James G. Schroth, Troy, MI (US); Thomas A. Perry, Bruce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 365 days.

(21) Appl. No.: 16/176,013

(22) Filed: Oct. 31, 2018

(65) Prior Publication Data

US 2020/0136482 A1    Apr. 30, 2020

(51) Int. Cl.
| | |
|---|---|
| H02K 15/06 | (2006.01) |
| H02K 1/16 | (2006.01) |
| H02K 15/02 | (2006.01) |
| H02K 3/12 | (2006.01) |

(52) U.S. Cl.
CPC ............ *H02K 15/064* (2013.01); *H02K 1/16* (2013.01); *H02K 3/12* (2013.01); *H02K 15/024* (2013.01); *H02K 2213/12* (2013.01)

(58) Field of Classification Search
CPC ............... H02K 15/064; H02K 15/024; H02K 2213/12; H02K 1/16; H02K 3/12
USPC .......................................................... 310/208
See application file for complete search history.

(56) References Cited

U.S. PATENT DOCUMENTS

| | | | |
|---|---|---|---|
| 8,215,000 B2 | 7/2012 | Guercioni | |
| 10,389,199 B2* | 8/2019 | Langlard | H02K 15/085 |
| 2007/0147993 A1 | 6/2007 | Lhoest et al. | |
| 2014/0035426 A1* | 2/2014 | Perry | H02K 3/345 |
| | | | 310/208 |
| 2014/0125189 A1 | 5/2014 | Hoemann | |
| 2014/0191610 A1* | 7/2014 | Hasegawa | H02K 3/40 |
| | | | 310/208 |
| 2014/0225463 A1* | 8/2014 | Miyasaka | H02K 1/145 |
| | | | 310/52 |
| 2015/0091408 A1* | 4/2015 | Azusawa | H02K 3/28 |
| | | | 310/208 |
| 2015/0333606 A1* | 11/2015 | Hanna | H02K 15/0012 |
| | | | 310/211 |
| 2016/0254733 A1* | 9/2016 | Niccolini | H02K 3/345 |
| | | | 29/596 |
| 2016/0276887 A1* | 9/2016 | Watanabe | H02K 3/50 |
| 2017/0141635 A1* | 5/2017 | Iki | H02K 3/28 |
| 2018/0115227 A1 | 4/2018 | Kim | |
| 2018/0262068 A1* | 9/2018 | Koshino | H02K 9/19 |

FOREIGN PATENT DOCUMENTS

WO    WO-2014060807 A2 *   4/2014    ............ H02K 3/493

* cited by examiner

*Primary Examiner* — Forrest M Phillips
(74) *Attorney, Agent, or Firm* — Cantor Colburn LLP

(57) ABSTRACT

A modular stator includes a first stator module and a second stator module. The first stator module includes a plurality of first coil end regions and a plurality of first junctions. The second stator module includes a plurality of second coil end regions and a plurality of second junctions. The first stator module and the second stator module are joined at the plurality of first junctions and the plurality of second junctions.

20 Claims, 8 Drawing Sheets

MODULAR STATOR

TECHNICAL FIELD

The present disclosure relates to a stator for use in an electric motor.

BACKGROUND

An electric motor uses electric potential energy to produce mechanical energy through the interaction of magnetic fields and current-carrying conductors. Electric machines may include an element rotatable about a central axis. The rotatable element, which may be referred to as a rotor, may be coaxial with a static element, which may be referred to as a stator. The electric machine uses relative rotation between the rotor and stator to produce mechanical energy or electrical energy.

Stators are traditionally manufactured by manually bending the wires which form the stator coils. First, the wire may be cut to the desired length and stripped, then bent into a hairpin shape by hand on a one at a time basis, then the two legs of the hairpin separated one hairpin at a time and hand inserted into one end of a stator, with the stripped ends of the wires sticking out of the other end of the stator being all bent all in one row uniformly in one direction and all in the adjacent row uniformly bent in the opposite direction so interconnection of wires in the two rows forming a given phase could be welded, one at a time, to provide the stator windings. However, to bring out the connections to the phases, and to interconnect phases, the corresponding wires needed to be re-bent to isolate them from the connections within each phase, something again previously done by hand.

SUMMARY

The present disclosure provides a modular stator having a first stator module and a second stator module. The first stator module includes a plurality of first coil end regions and a plurality of first junctions. The second stator module includes a plurality of second coil end regions and a plurality of second junctions. The plurality of first junctions are joined to a corresponding plurality of second junctions to form the modular stator.

The first and second stator modules may be provided in a variety of forms. In one non-limiting example, the first stator module may include a plurality of first hair pin wires which include the plurality of first coil end regions and the plurality of first junctions. The plurality of first hair pin wires are at least partially disposed within slots defined in the first stator core module. Similarly, the second stator module may include a plurality of second hair pin wires which include the plurality of first coil end regions and the plurality of first junctions. It is understood that each hair pin wire (in the first and second set) includes a coil end and a pair of junctions. The plurality of second hair pin wires are at least partially disposed within the slots defined in the second stator core module.

In another non-limiting example, the first stator module may be formed by a first stator core and a first crown. The first crown houses the plurality of first coil end regions and a plurality of first crown junctions extend from a first crown interfacing surface in the first crown. The plurality of first crown junctions are joined with a plurality of first core junctions disposed on the first stator core to form the first stator module. Similarly, in this non-limiting example, the second stator module may be formed by a second stator core and a second crown. The second crown houses the plurality of second coil end regions and a plurality of second crown junctions 24a' extend from a second crown interfacing surface. The plurality of second crown junctions 24a' are joined with a plurality of second core junctions disposed on the second stator module.

Regardless of whether the first stator module and the second stator module each further include a separate crown. A central fixture may be disposed between the first stator module and the second stator module wherein the central fixture defines a plurality of junction apertures which are configured to align the plurality of first junctions and the plurality of second junctions. Each junction aperture in the central fixture is configured to support a first junction and a corresponding second junction. Moreover, the central fixture further defines at least one tooling passageway which is configured to enable a joining tool to access the first junction and the second junction which are aligned within each junction aperture. The aforementioned central fixture may be formed from a thermally insulating material. It is understood that the central fixture may, but not necessarily be a monolithic component which defines the plurality of junction apertures and the at least one tooling passageway. In the event the central fixture is a monolithic component, then the central fixture is configured to remain in the modular stator when assembly is completed. The central fixture may also, but not necessarily be a two-piece component which is formed by a removable inner coil and a removable outer coil. Regardless of the configuration of the central fixture, the central fixture may optionally include a cooling passageway.

In the event that the first stator module is formed by a first crown and a first stator core, a first crown fixture may be disposed between the first stator core and the first crown. Similar to the configuration of the central fixture, the first crown fixture defines a plurality of junction apertures. The plurality of junction apertures in the first crown fixture is configured to support the plurality of first junctions and the first crown junctions such that each junction aperture is configured to support a first junction and a first crown junction from the plurality of first crown junctions. The first crown fixture further defines at least one tooling passageway which is configured to enable a joining tool to access the first junction and the first crown junction which are aligned within each junction aperture. The first crown fixture may be formed from a thermally insulating material. The first crown fixture may optionally be formed as a monolithic component or may be optionally formed as a two-piece component wherein the two-piece component is formed by a removable inner coil and a removable outer coil.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
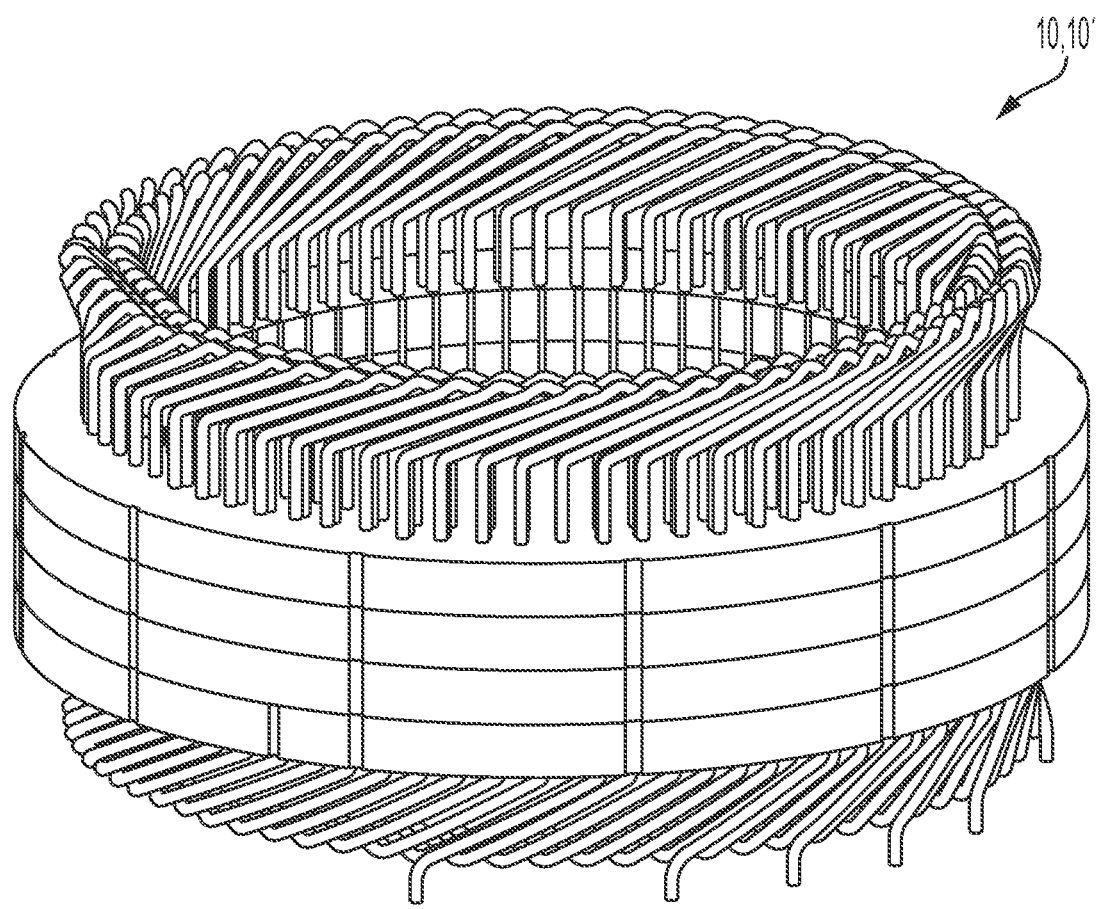
FIG. 1 illustrates an example modular stator of the present disclosure wherein the insulating material of the first and second crowns are removed in order to illustrate the coil end regions.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

The present disclosure provides a modular stator 10 having a first stator module 12 and a second stator module 15 with respect to all embodiments in the present disclosure. The first stator module 12 includes a plurality of first coil end regions 24 and a plurality of first junctions 22*i*. The second stator module 15 includes a plurality of second coil end regions 24' and a plurality of second junctions 22*i*'. The plurality of first junctions 22*i* are joined to a corresponding plurality of second junctions 22*i*' to form the modular stator.

Figure 3A:
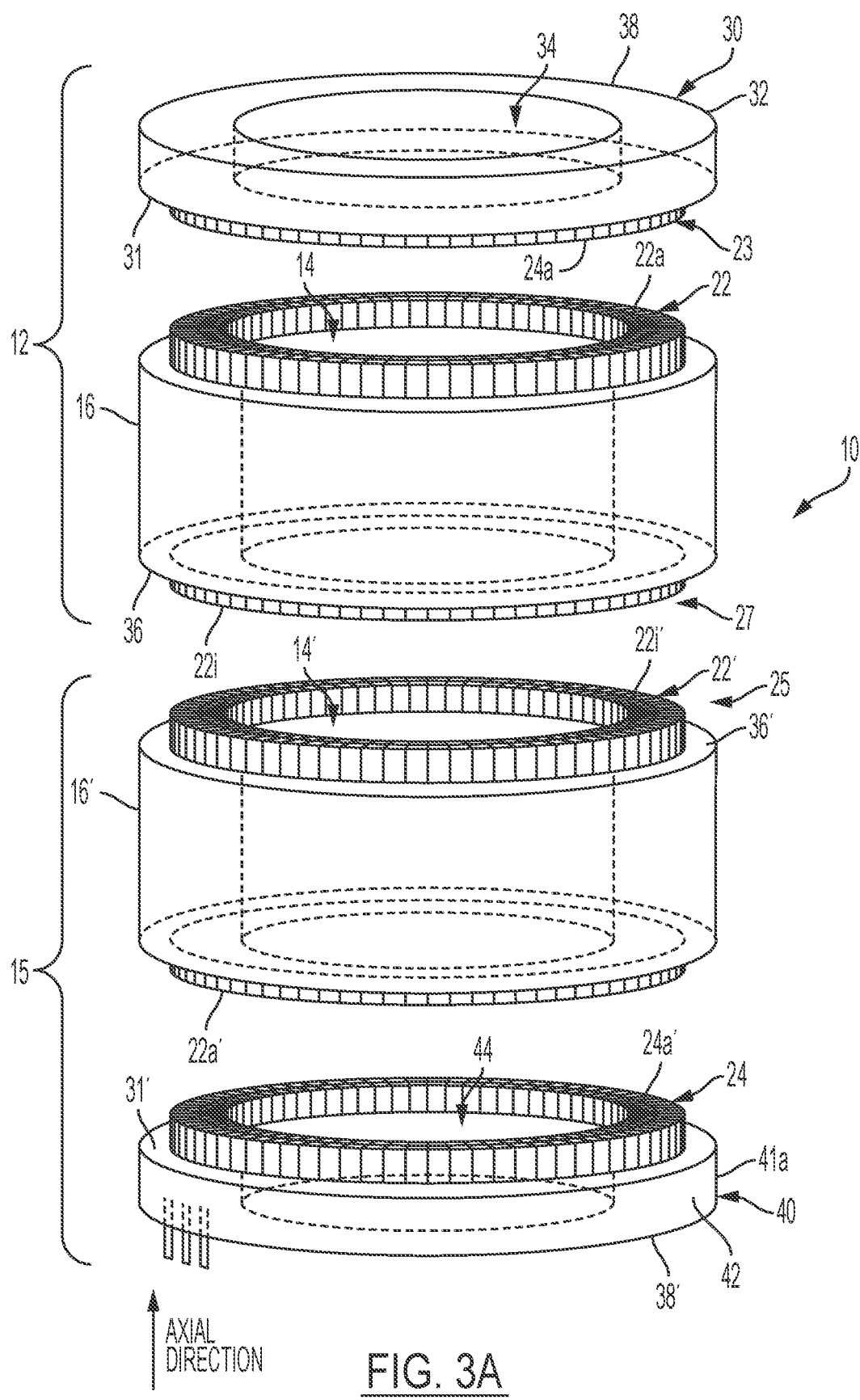
FIG. 3A illustrates an expanded view of an example, non-limiting modular stator wherein the fixtures are removed in order to illustrate the various junctions.
Figure 3B:
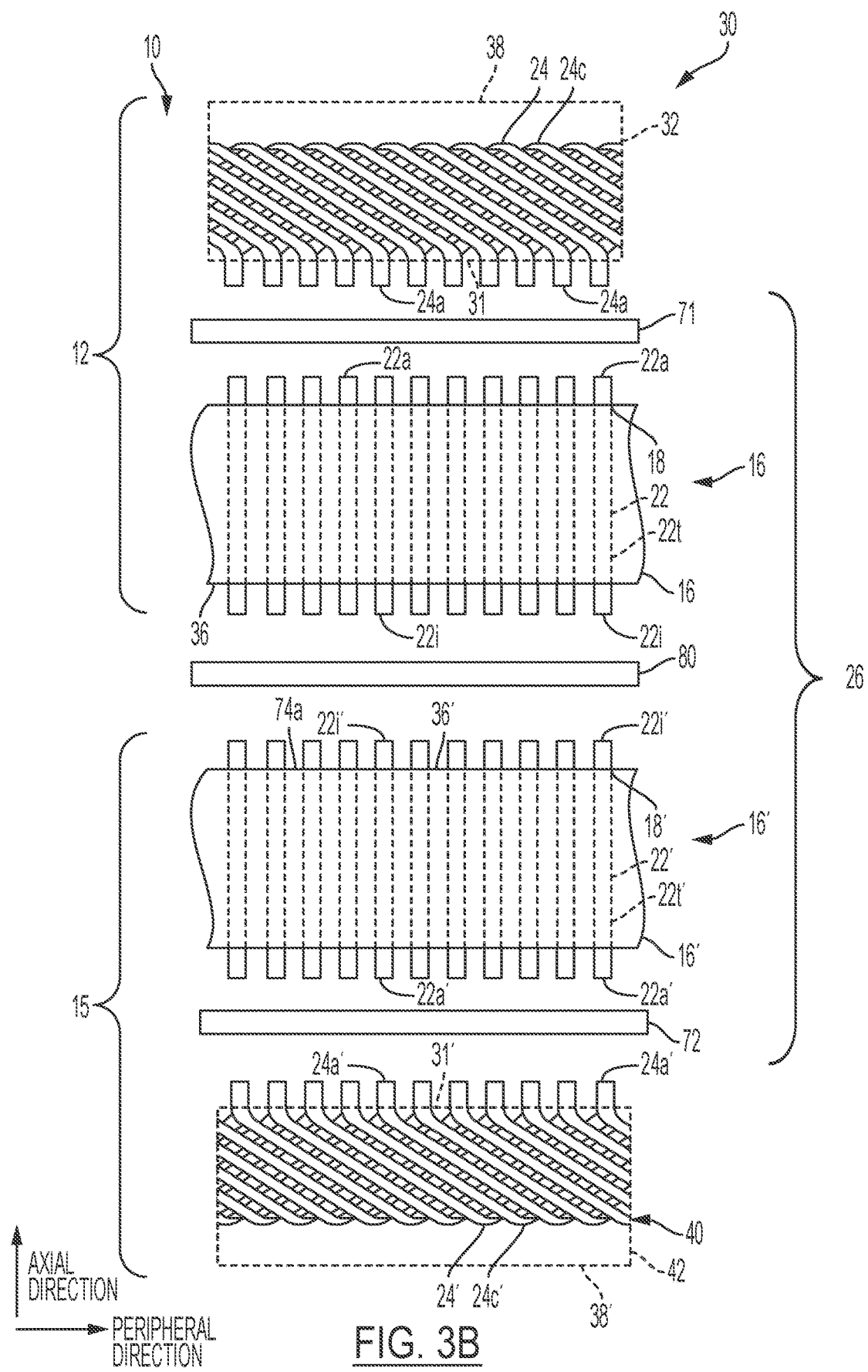
FIG. 3B illustrates an expanded, schematic view of the modular stator of FIG. 3A wherein the fixtures are shown.

The first and second stator modules 12, 12', 15, 15' may be provided in a variety of forms. For example, as shown in FIGS. 3A-3B, the first stator module 12 may be formed by a first stator core 16 and a first crown 30. The first crown 30 houses the plurality of first coil end regions 24 and a plurality of first crown junctions 24*a* extend from a first crown interfacing surface in the first crown 30. The plurality of first crown junctions 24*a* which are joined with a plurality of first core junctions disposed on the first stator core 16 to form the first stator module 12. Similarly, in this non-limiting example, the second stator module 15 may be formed by a second stator core 16' and a second crown 40. The second crown 40 houses the plurality of second coil end regions 24' and a plurality of second crown junctions 24*a*' extend from a second crown interfacing surface. The plurality of second crown junctions 24*a*' are joined with a plurality of second core junctions 22*a*' disposed on the second stator core 16'.

Figure 2:
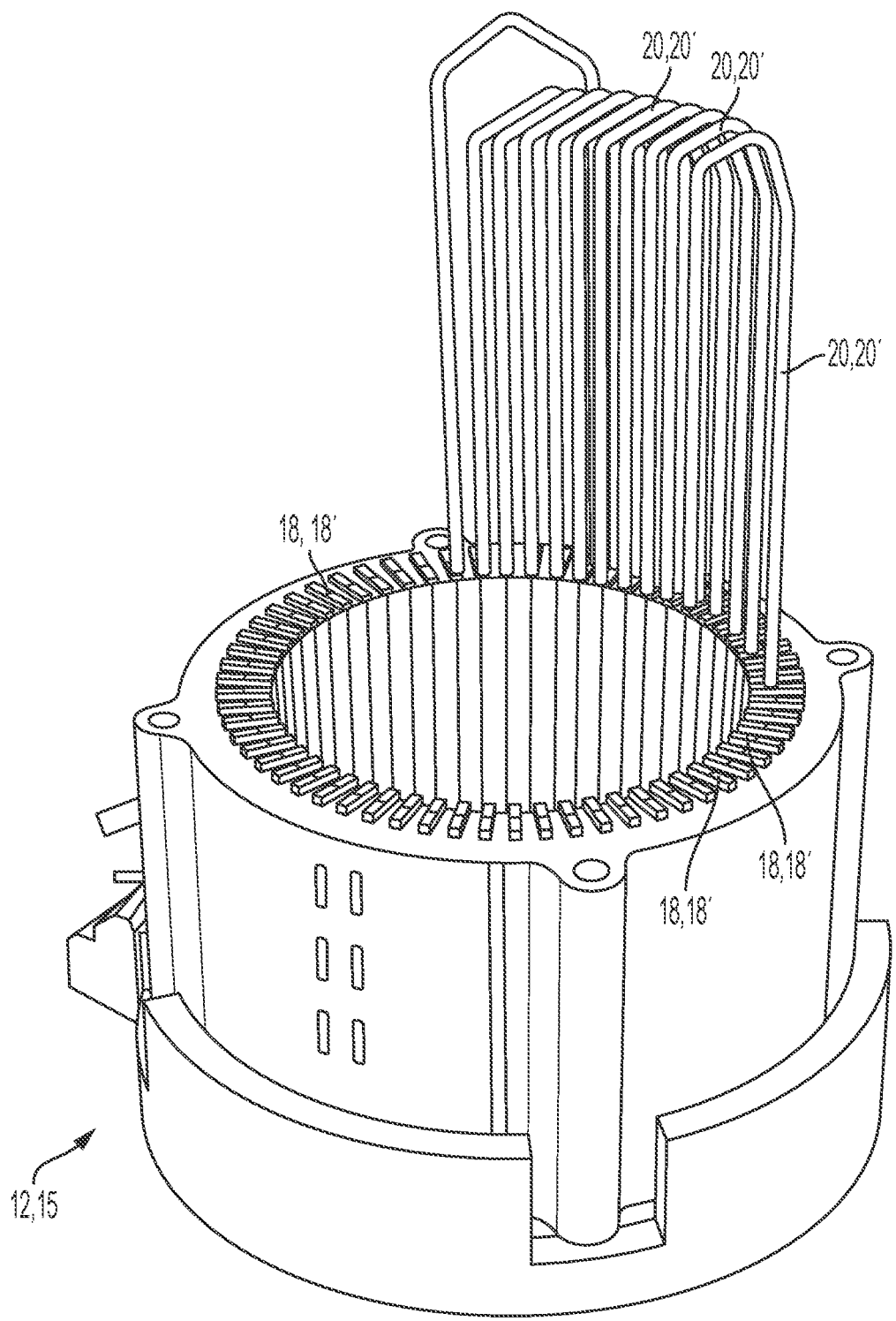
FIG. 2 illustrates the (first or second) stator core module as the hair pin wires are being inserted into the slots.
Figure 4A:
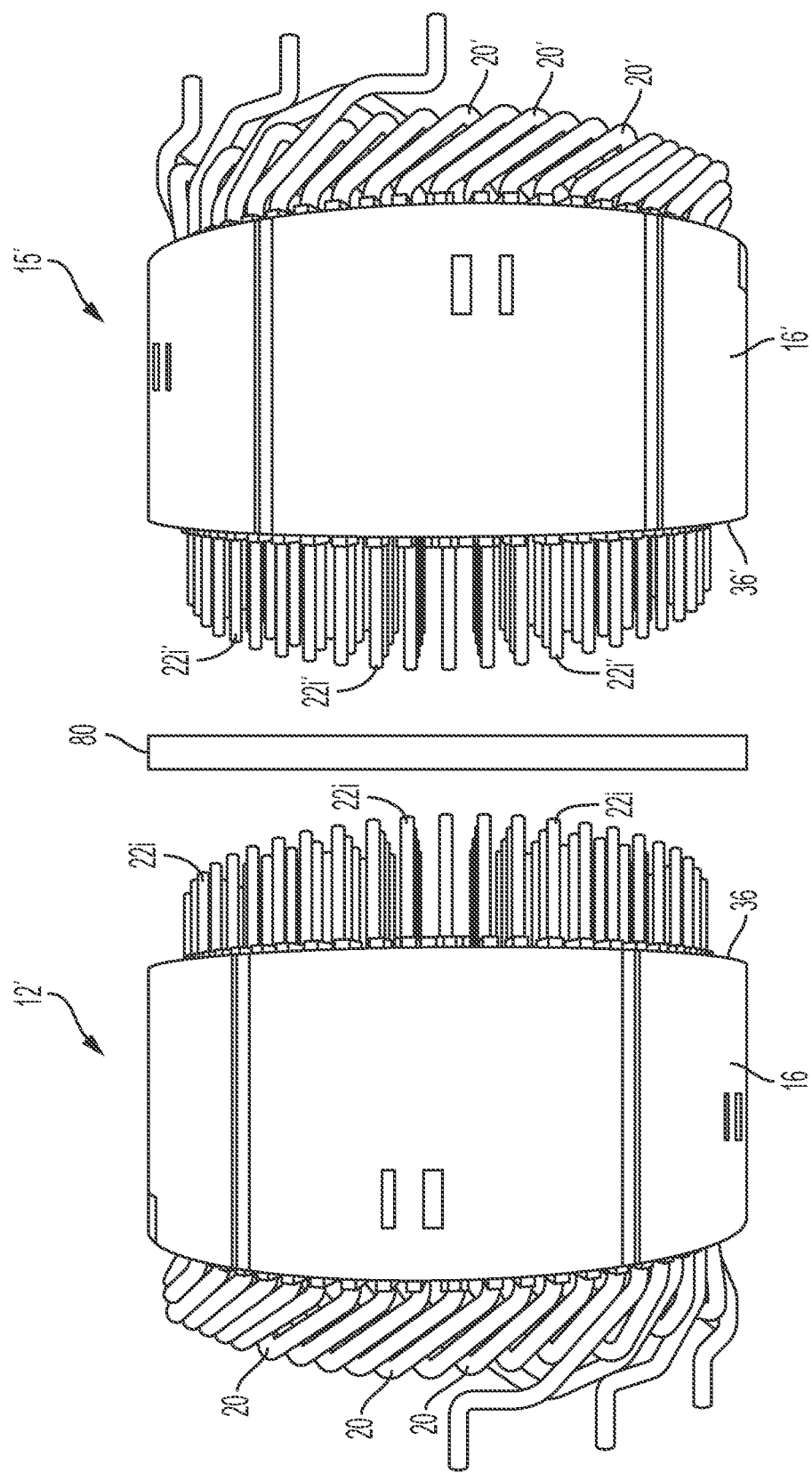
FIG. 4A illustrates an expanded view of another example, non-limiting modular stator according to the present disclosure.
Figure 4B:
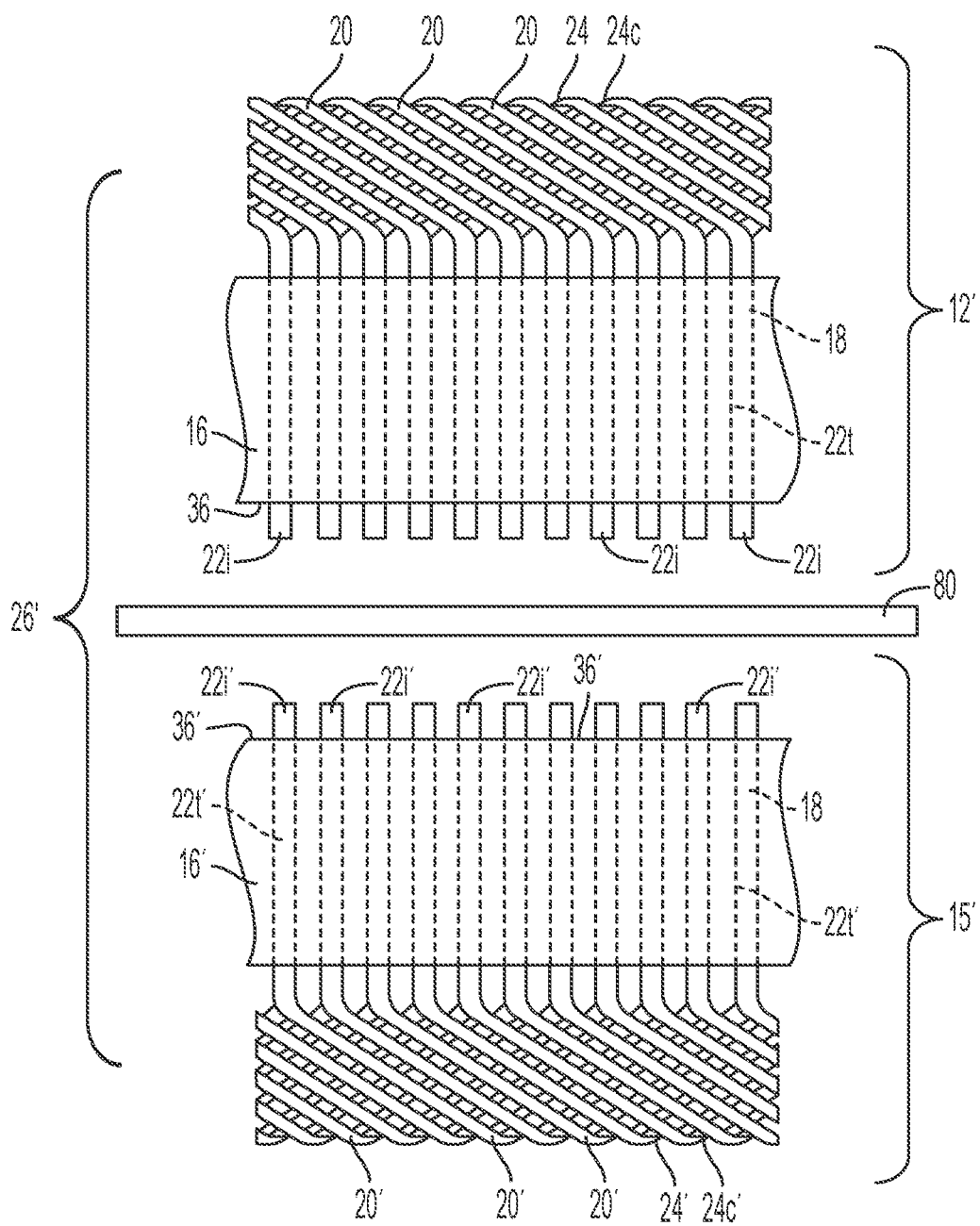
FIG. 4B illustrates an expanded, schematic view of the modular stator of FIG. 4A.

However, either or both of the first and second stators modules 12, 12', 15, 15' may be provided in other forms. For example, in another non-limiting example of the present disclosure shown in FIGS. 4A-4B, the modular stator includes a first stator module 12' and a second stator module 15' where, the first stator module 12' includes a plurality of first coil end regions 24 and a plurality of first junctions 22*i*. The second stator module 15' includes a plurality of second coil end regions 24' and a plurality of second junctions 22*i*'. The plurality of first junctions 22*i* are joined to a corresponding plurality of second junctions 22*i*' to form the modular stator. Under the aforementioned arrangement, the first stator module 12' may include a plurality of first hair pin wires 20 (FIGS. 2 and 4A) which include the plurality of first coil end regions 24 and the plurality of first junctions 22i. The plurality of first hair pin wires 20 are at least partially disposed within slots 18 defined in the first stator module 12'. Similarly, the second stator module 15' may include a plurality of second hair pin wires 20' which include the plurality of first coil end regions 24 and the plurality of first junctions 22i. It is understood that each hair pin wire 20, 20' (in the first and second set) includes a coil end region 24, 24', a pair of linear conductor portions 22t, 22t' and a pair of junctions 22i, 22i' disposed at the ends of each hair pin wire 20, 20'. Thus, the plurality of second hair pin wires 20' are at least partially disposed within the slots 18' defined in the second stator module 15' while the plurality of first hair pin wires 20 are at least partially disposed within the slots 18 of the first stator module 12.

Figure 5:
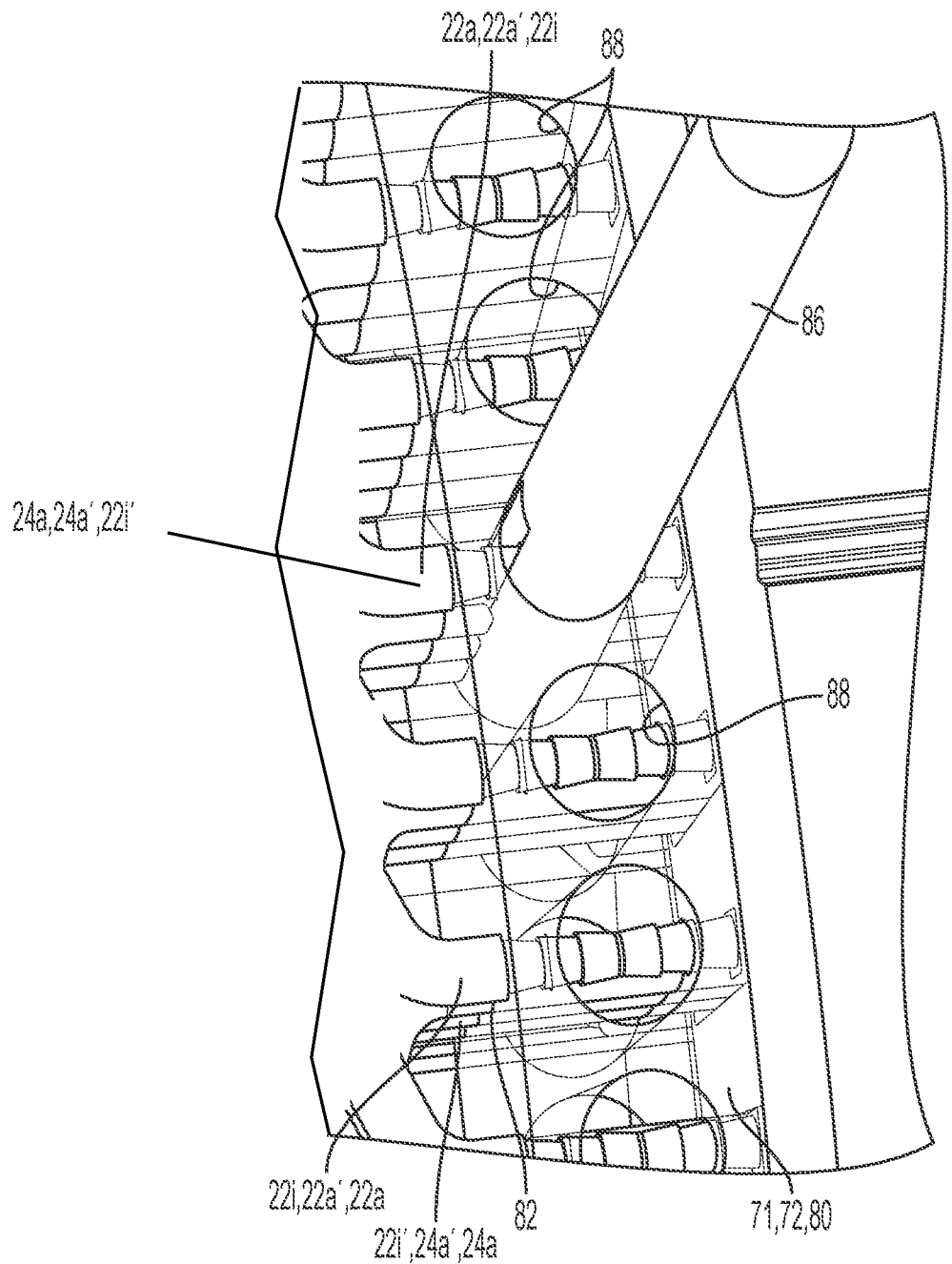
FIG. 5 illustrates the (central, first crown or second crown) fixture wherein the respective junctions are disposed in the respective fixture.

Regardless of how each of the first stator module 12 and the second stator module 15 are formed, a central fixture 80 may be disposed between the first stator module 12, 12' and the second stator module 15, 15' wherein the central fixture 80 (FIGS. 3A-4B) defines a plurality of junction apertures 82 (FIG. 5) which are configured to align the plurality of first junctions 22i with the plurality of second junctions 22i'. Thus, each junction aperture 82 in the central fixture 80 is configured to support a first junction 22i and a corresponding second junction 22i'. Moreover, the central fixture 80 further defines at least one tooling passageway 88 which is configured to enable a joining tool 86 to access the first junction and the second junction which are aligned within each junction aperture 82 (FIG. 5). The aforementioned central fixture 80 may be formed from a thermally insulating material 46. It is understood that the central fixture 80 may, but not necessarily be a monolithic component 48 which defines the plurality of junction apertures 82 and the at least one tooling passageway 88. In the event the central fixture 80 is a monolithic component 48, then the central fixture 80 is configured to remain in the modular stator when assembly is completed. The central fixture 80 may also, but not necessarily be a two-piece component 50 which is formed by a removable inner coil 66 and a removable outer coil 68. Regardless of the configuration of the central fixture 80, the central fixture 80 may optionally include a cooling passageway 78. Therefore, a stator 10 of a rotating electric machine 8 according to the present disclosure is equipped with coils that are interconnected through distributed winding onto a stator core 26, 26' of a rotating electric machine 8. This stator 10 is formed by a first stator module 12, 12' and a second stator module 15, 15'.

As noted, an embodiment of the present disclosure may include an arrangement where the first stator module 12 is formed by a first stator core 16 and a first crown 30 (FIGS. 3A-3B) wherein individual parts of linear conductor portions 22 for the first stator module 12 are at least partially disposed in slots 18 of the first stator core 16. On a first side 28 of the first stator core 16, a plurality of first stator core junctions 22a protrude from the first side 28 of the first stator core 16. The first crown 30 includes an insulating mold 32 in the shape of a cylinder wherein coil end regions 24 are molded or embedded within the insulating mold 32. The coil end regions 24 of the first crown 30 are included in the first crown 30 such that the first crown junctions (ends) 24a of the coil end regions 24 protrude out of the insulating mold 32 for the first crown 30. The stator 10 in FIGS. 3A-3B has a structure wherein the first stator core junctions 22a and the first crown junctions (ends) 24a are joined as the first crown 30 is joined to the first stator core 16.

Therefore, the stator 10 of the rotating electric machine 8, may include a first stator module 12 and a second stator module 15 wherein each of the first and second stator modules 12, 15 includes a stator core (first stator core 16 for the for the first stator module 12 and a second stator core 16' for the second stator module 15) such that each stator core 16, 16' is affixed to a corresponding crown (first crown 30 for the first stator core 16 or a second crown 40 for a second stator core 16'). The coil end regions 24, 24' of the stator coils may be embedded in their corresponding (first or second) crown 30, 40. Therefore, in the event the linear conductor portion 22 is not part of a hair pin wire 37 (see FIGS. 3A and 3B) the first stator core 16 may further include junctions 22a which are configured to connect to (or be joined with) the first crown junctions 24a in the first crown 30. The second stator core 16' may similarly include junctions 22a' which are configured to connect to second crown junctions 24a' in a second crown 40.

The first crown 30 may be affixed to the first stator core 16. The first crown 30 may be composed of an insulating mold 32 having a cylindrical shape wherein the first coil end regions 24 are embedded or molded within the insulating mold 32. The insulating mold 32 may, but not necessarily, be formed from a resin. As indicated, the first crown 30 may be formed in a round cylindrical shape, and, specifically, is provided with a hole portion 34 extending along the axial direction from the center portion of the outer crown surface 38 (the top end portion) to the center portion of the interfacing crown surface 36 (the bottom end portion). The coil end regions 24 in the first crown 30 are provided with a plurality of first crown junctions 24a which extend away from the interfacing crown surface 36 of the first crown 30. The first crown junctions 24a of the first crown 30 are joined to the corresponding first stator core junctions 22a of the first stator core 16 via any one of a variety of joining processes—such as, but not limited to laser, brazing, etc.

The second crown 40 may be affixed to the second stator core 16'. The second crown 40 may include an insulator mold 42 in a round cylindrical shape wherein a plurality of coil end regions 24' are embedded or molded in the insulator mold 42. This second crown 40 may define a hole portion 44 extending along the axial direction from the center portion of the inner crown surface 31' of the second crown 40 to the center portion of the outer crown surface 38' of the second crown 40. The coil end regions 24' of the second crown 40 are each provided with junctions 24a' which extend away from the inner crown surface 31' of the second crown 40. These junctions 24a' of the second crown 40 are joined to the corresponding junctions 22a' of the second stator core 16'.

Therefore, the first crown 30 may be composed of an insulating mold 32 having a cylindrical shape wherein the first coil end regions 24 are embedded or molded within the insulating mold 32. Similarly, the second crown 40 may include an insulator mold 42 in a round cylindrical shape wherein a plurality of coil end regions 24 are embedded or molded in the insulator mold 42. The insulator mold 32 (42), such as resin, is formed into a round cylindrical shape, and a hole portion 34 (44) is formed therein. With respect to each of the first and second crowns 30, 40, the coil end regions 24, 24' has a bent conductor portion 24c (24c'), and a junction 24a (24a') is disposed at each end of the bent conductor portion 24c (24c'). The bent conductor portion 24c (24c') may be formed with a circular cross-sectional shape, but it may also instead be formed with a rectangular cross-sectional shape. The junction 24a (24a') is formed in a rectangular cross-sectional shape. Specifically, the (first and second crown) junctions 24a (24a') may be disposed in two rows wherein a first row may be disposed toward the inner peripheral side of the crown and a second row may be disposed toward the outer peripheral side of the crown at prescribed intervals along the circumferential direction of the inner periphery of the respective cylindrical insulator mold 32 (42).

With reference back to FIGS. 3A-3B, an example of a structure for the first stator core 16 and/or second stator core 16' will be explained in greater detail next. The (first or second) stator core 16, 16' is formed into a round cylindrical shape, and a hole portion 14, 14' is provided in the center portion thereof, where a plurality of slots 18, 18' (FIG. 3B) that pass through, in the axial direction, is provided in the vicinity of the inner peripheral portion thereof. These slots 18, 18' are formed at prescribed intervals along the circumferential direction of the inner periphery of the first stator core 16 and/or second stator core 16'. Moreover, these slots 18, 18' are formed radiating in the radial direction. A linear conductor portion 22, 22' (FIG. 3B) may be a rectangular wire which has a rectangular cross-section (a flat rectangular cross-section) which is inserted into, and held in, each of these slots 18, 18'. (See FIG. 3B). Specifically, respective linear conductor portions 22, 22' may be provided on the inner peripheral side and the outer peripheral side in each of these slots 18, 18'. The stator core junctions (elements 22a, 22i for first stator; elements 22a' and 22i' for the second stator) at the end of each linear conductor portion 22, 22' are disposed so as to protrude from the interfacing surface 36, 36' (and the crown surface 28, 28') of each stator core 12, 15.

Therefore, as described above and as shown in FIGS. 3A-3B, the first stator module 12 may optionally be formed by a first stator core 16 and a first crown 30. The first crown 30 houses the plurality of first coil end regions 24 and a plurality of first crown junctions 24a extend from a first crown interfacing surface 31 in the first crown 30. The plurality of first crown junctions 24a are joined with a plurality of first core junctions 22a disposed on the first stator core 16 to form the first stator module 12. Similarly, in this non-limiting example, the second stator module 15 may be formed by a second stator core 16' and a second crown 40. The second crown 40 houses the plurality of second coil end regions 24' and a plurality of second crown junctions 24a' extend from a second crown interfacing surface. The plurality of second crown junctions 24a' are joined with a plurality of second core junctions 22a' disposed on the second stator core 16'. (FIGS. 3A-3B)

Regardless of whether the first stator module 12 and the second stator module 15 each further include a separate crown (first crown 70 and second crown 72), a central fixture 80 may be disposed between the first stator module 12 and the second stator module 15 wherein the central fixture 80 defines a plurality of junction apertures 82 which are configured to align the plurality of first junctions 22i and the plurality of second junctions 22i' (FIGS. 3B-4B). Each junction aperture 82 (FIG. 5) in the central fixture 80 is configured to support a first junction 22i and a corresponding second junction 22i'. Moreover, the central fixture 80 further defines at least one tooling passageway 88 which is configured to enable a joining tool 86 to access the first junction 22i and the second junction 22i' which are aligned within each junction aperture 82.

The aforementioned central fixture 80 may be formed from a thermally insulating material. It is understood that the central fixture 80 may, but not necessarily be a monolithic component which defines the plurality of junction apertures 82 and the at least one tooling passageway 88. In the event the central fixture 80 is a monolithic component, then the central fixture 80 is configured to remain in the modular stator 10 when assembly is completed. The central fixture 80 may also, but not necessarily be a two-piece component which is formed by a removable inner coil 66 and a removable outer coil 68. Regardless of the configuration of the central fixture 80, the central fixture 80 may optionally include a cooling passageway.

In the event that the first stator module 12 is formed by a first crown 30 and a first stator core 16, a first crown fixture 71 (FIG. 5) may be disposed between the first stator core 16 and the first crown 30. Similar to the configuration of the central fixture 80, the first crown fixture 71 defines a plurality of junction apertures 82. The plurality of junction apertures 82 in the first crown fixture 71 are configured to support the plurality of first junctions 22i and the first crown junctions 24a such that each junction aperture 82 is configured to support a junction from the plurality of first junctions 22i and a first crown junction 24a. The first crown fixture 71 further defines at least one tooling passageway 88 which is configured to enable a joining tool 86 to access the first junction and the first crown junction which are aligned within each junction aperture 82. The first crown fixture 71 may be formed from a thermally insulating material 46 such as a resin 46. (FIG. 3B). The first crown fixture 71 may also optionally be formed as a monolithic component 48 (FIG. 3B) or may be optionally formed as a two-piece component 50 (FIGS. 6A-6B) wherein the two-piece component 50 is formed by a removable inner coil 66 and a removable outer coil 68.

Figure 6A:
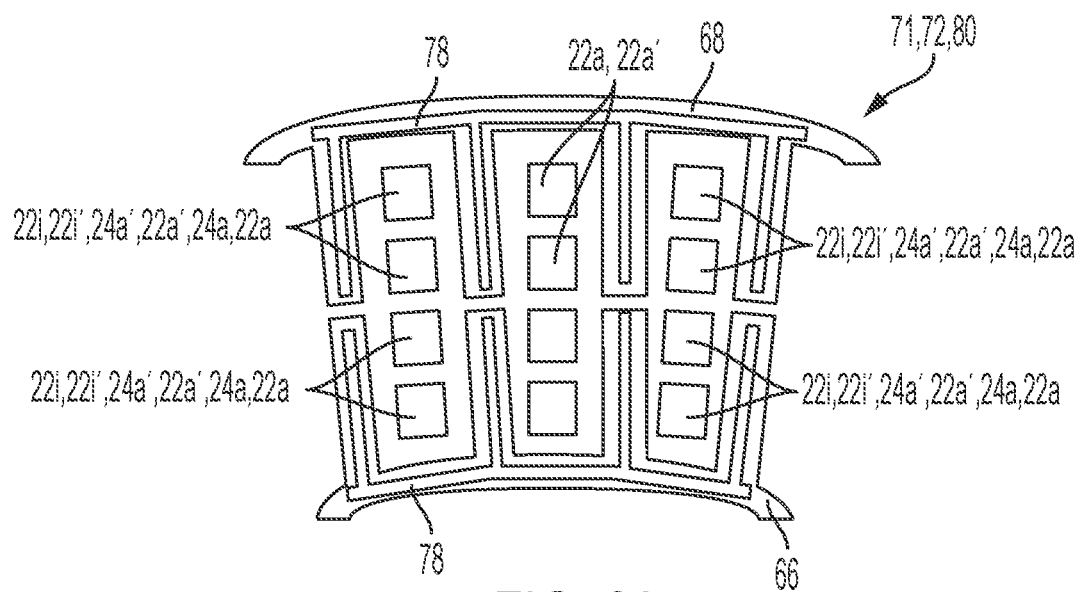
FIG. 6A illustrates an example, non-limiting embodiment for the (central, first crown or second crown) fixture wherein the fixture is a two-piece component.
Figure 6B:
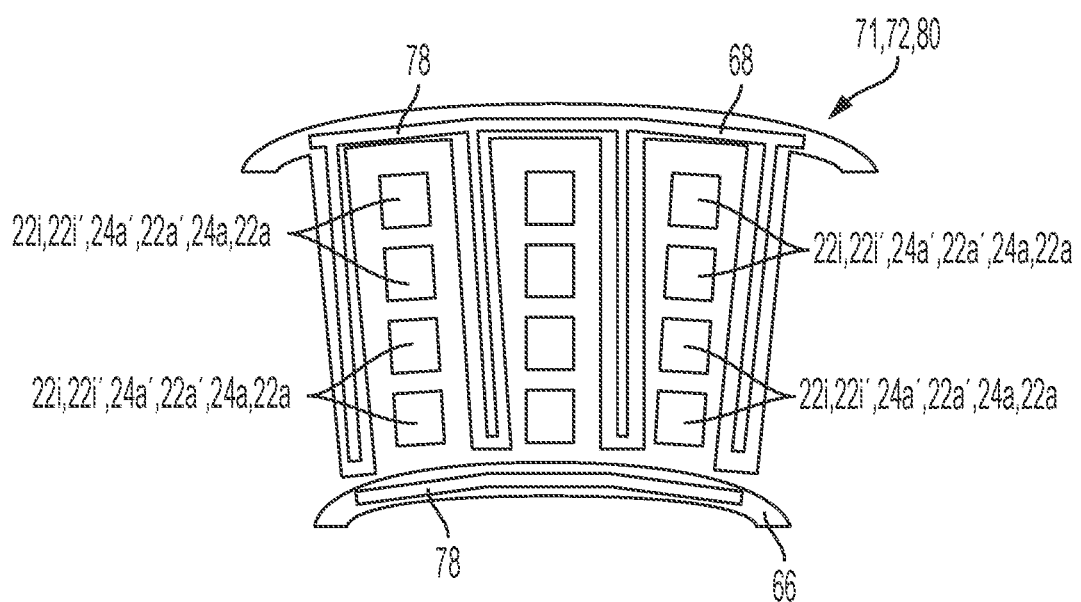
FIG. 6B illustrates another example, non-limiting embodiment for the (central, first crown or second crown) fixture wherein the fixture is a two-piece component.

Similarly, in the event that the second stator module 15 is formed by a second crown 40 and a second stator core 16', a second crown fixture 40 (FIGS. 3B and 5) may be disposed between the second stator core 16' and the second crown 40. Similar to the configuration of the central fixture 80, the second crown fixture 40 defines a plurality of junction apertures 82. The plurality of junction apertures 82 in the second crown fixture 40 is configured to support the plurality of second junctions 22i' and the second crown junctions 24a' such that each junction aperture 82 is configured to support a second junction from the plurality of second junctions 22i' and a second crown junction 24a'. The second crown fixture 40 further defines at least one tooling passageway 88 which is configured to enable a joining tool 86 to access the second junction and the second crown junction 24a' which are aligned within each junction aperture 82. The second crown fixture 40 may be formed from a thermally insulating material 46. (FIG. 3B) The second crown fixture 40 may optionally be formed as a monolithic component 48 (FIG. 38) or may be optionally formed as a two-piece component 50 (FIGS. 3B, 6A-6B) wherein the two-piece component (FIG. is formed by a removable inner coil 66 and a removable outer coil 68. A cooling passageway 78 (FIGS. 6A-6B) may be defined in at least one of the removable inner coil 66 and/or the removable outer coil 68. FIGS. 6A and 6B show two example non-limiting embodiments of the inner and outer coils 66, 68. Therefore, the stator 10 according to the present disclosure includes wired coils which are interconnected in a distributed winding on the stator core 26 of the rotating electric machine 8.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A modular stator comprising:
   a first stator module having a plurality of first coil end regions and a plurality of first junctions; and
   a second stator module having a plurality of second coil end regions and a plurality of second junctions;
   wherein the plurality of first junctions are joined to the corresponding plurality of second junctions;
   wherein a central fixture is disposed between the first stator module and the second stator module, the central fixture defining a plurality of junction apertures which are configured to align the plurality of first junctions and the plurality of second junctions, each junction aperture is configured to support a first junction and a corresponding second junction; and
   wherein the central fixture further defines at least one tooling passageway which is configured to enable a joining tool to access the first junction and the second junction which are aligned within each junction aperture.

2. The modular stator as defined in claim 1 wherein the plurality of first coil end regions and the plurality of first junctions are regions defined in a plurality of first hair pin wires which are at least partially disposed within the first stator core module, and the plurality of second coil end regions and the plurality of second junctions are regions defined in a plurality of second hair pin wires which are at least partially disposed within the second stator core module.

3. The modular stator as defined in claim 2 wherein the central fixture is formed from a thermally insulating material.

4. The modular stator as defined in claim 3 wherein the central fixture is one of a monolithic component or a two-piece component wherein the two-piece component is formed by a removable inner coil and a removable outer coil.

5. The modular stator as defined in claim 1 wherein the first stator module includes a plurality of first hair pin wires disposed within a plurality of first stator module slots, each hair pin wire includes a coil end region.

6. The modular stator as defined in claim 5 wherein the central fixture is formed from a thermally insulating material.

7. The modular stator as defined in claim 6 wherein the central fixture is one of a monolithic component or a two-piece component wherein the two-piece component is formed by a removable inner coil and a removable outer coil.

8. A modular stator comprising:
   a first stator module having a plurality of first coil end regions and a plurality of first junctions; and
   a second stator module having a plurality of second coil end regions and a plurality of second junctions;
   wherein the plurality of first junctions are joined to the corresponding plurality of second junctions;
   wherein the plurality of first coil end regions and the plurality of first junctions are regions defined in a plurality of first hair pin wires which are at least partially disposed within the first stator core module, and the plurality of second coil end regions and the plurality of second junctions are regions defined in a plurality of second hair pin wires which are at least partially disposed within the second stator core module;
   wherein the first stator module includes a plurality of first hair pin wires disposed within a plurality of first stator module slots, each hair pin wire includes a coil end region;
   wherein a central fixture is disposed between the first stator module and the second stator module, the central fixture defining a plurality of junction apertures which are configured to align the plurality of first junctions and the plurality of second junctions, each junction aperture is configured to support a first junction and a corresponding second junction; and
   wherein the central fixture further defines at least one tooling passageway which is configured to enable a joining tool to access the first junction and the second junction which are aligned within each junction aperture.

9. The modular stator as defined in claim 8 wherein the second stator module includes a plurality of second hair pin wires disposed within a plurality of second stator module slots, each hair pin wire in the plurality of second hair pin wires includes a coil end region.

10. The modular stator as defined in claim 8 wherein the central fixture is formed from a thermally insulating material.

11. The modular stator as defined in claim 10 wherein the central fixture is one of a monolithic component or a two-piece component wherein the two-piece component is formed by a removable inner coil and a removable outer coil.

12. A modular stator comprising:
    a first stator module having a plurality of first coil end regions and a plurality of first junctions; and
    a second stator module having a plurality of second coil end regions and a plurality of second junctions;
    wherein the plurality of first junctions are joined to the corresponding plurality of second junctions;
    wherein the first stator module includes a first stator core and a first crown housing the plurality of first coil end regions, a plurality of first crown junctions extend from a first crown interfacing surface and the plurality of first crown junctions are joined with a plurality of first core junctions disposed on the first stator module;
    wherein a first crown fixture is disposed between the first stator module and the first crown fixture, the first crown fixture defines a plurality of junction apertures which are configured to align the plurality of first junctions and the first crown junctions, each junction aperture is configured to support a first junction and a first crown junction; and
    wherein the first crown fixture further defines at least one tooling passageway which is configured to enable a joining tool to access the first junction and the first crown junction which are aligned within each junction aperture.

13. The modular stator as defined in claim 12 wherein the first crown fixture is formed from a thermally insulating material.

14. The modular stator as defined in claim 13 wherein the first crown fixture is one of a monolithic component or a two-piece component wherein the two-piece component is formed by a removable inner coil and a removable outer coil.

15. The modular stator as defined in claim 12 wherein the second stator module includes a second stator core and a second crown housing the plurality of second coil end regions, a plurality of second crown junctions extend from a second crown interfacing surface, and the plurality of second crown junctions are joined with a plurality of second core junctions disposed on the second stator module.

16. The modular stator as defined in claim 15 wherein a second crown fixture is disposed between the second stator module and the second crown fixture, the second crown fixture defines a plurality of junction apertures which are configured to align the plurality of second junctions and the second crown junctions, each junction aperture is configured to support a second junction and a second crown junction.

17. The modular stator as defined in claim 16 wherein the first crown fixture is formed from a thermally insulating material.

18. The modular stator as defined in claim 17 wherein the first crown fixture is one of a monolithic component or a two-piece component wherein the two-piece component is formed by a removable inner coil and a removable outer coil.

19. The modular stator as defined in claim 16 wherein the second crown fixture is formed from a thermally insulating material.

20. The modular stator as defined in claim 19 wherein the second crown fixture is one of a monolithic component or a two-piece component wherein the two-piece component is formed by a removable inner coil and a removable outer coil.

\* \* \* \* \*